United States Patent [19]
Esker

[11] Patent Number: 5,927,808
[45] Date of Patent: Jul. 27, 1999

[54] TUMBLE SEAT FOR AN AUTOMOTIVE VEHICLE INCLUDING IMPROVED SEAT CUSHION MOUNTING STRUCTURE

[75] Inventor: Richard C. Esker, Livonia, Mich.

[73] Assignee: Lear Corporation, Southfield, Mich.

[21] Appl. No.: 08/920,368

[22] Filed: Aug. 29, 1997

[51] Int. Cl.⁶ .............................. A47C 1/02; A47C 97/00
[52] U.S. Cl. ...................... 297/333; 297/335; 297/463.1; 296/65.05; 16/324
[58] Field of Search ..................................... 297/335, 336, 297/334, 333, 332, 331, 463.1, 463.2; 296/65.03, 65.05; 16/324, 325, 326

[56] References Cited

U.S. PATENT DOCUMENTS

| | | | |
|---|---|---|---|
| 4,978,158 | 12/1990 | Kubo et al. | 296/65.03 |
| 5,224,750 | 7/1993 | Clark et al. | 297/335 |
| 5,641,202 | 6/1997 | Rus | 297/335 |
| 5,662,367 | 9/1997 | Rastetter et al. | 296/65.03 |
| 5,673,459 | 10/1997 | Baghdasarian | 16/325 |
| 5,700,058 | 12/1997 | Balagurumurthy et al. | 297/463.1 |
| 5,743,596 | 4/1998 | Chabanne | 297/463.1 |

*Primary Examiner*—Anthony D. Barfield
*Attorney, Agent, or Firm*—Brooks & Kushman P.C.

[57] ABSTRACT

A tumble seat for an automotive vehicle wherein provision is made for pivoting a seat cushion frame for the tumble seat about a pivot pin with an axis that is transverse to the fore-and-aft center plane of the vehicle passenger compartment. The pivot pin is fixed to the bracket structure without the need for a threaded fastener. A spring, which is anchored on the pivot pin, has its active end engageable with the seat cushion frame so that a constant tilting torque on the seat cushion frame tends to tilt the seat cushion frame in an upright position when the tumble seat is not in use and when the seat cushion frame is unlatched from its lowered passenger-supporting position.

6 Claims, 5 Drawing Sheets

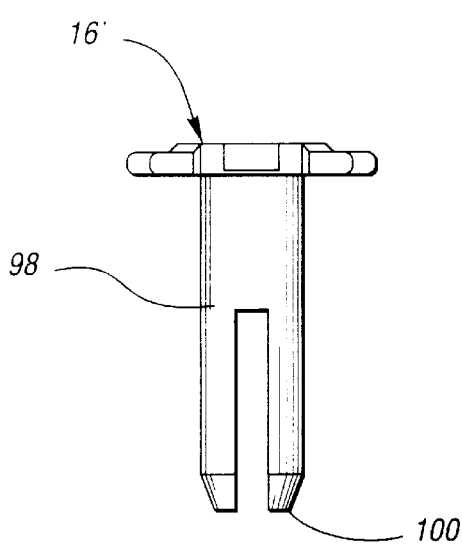
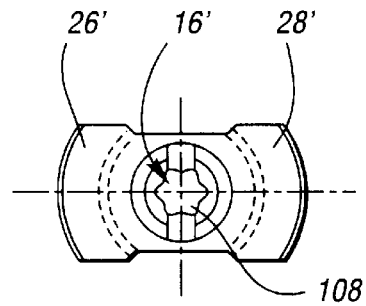
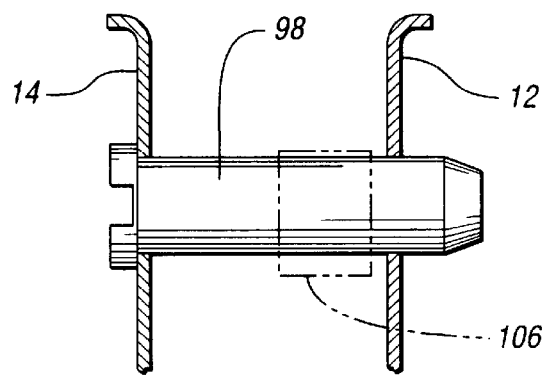
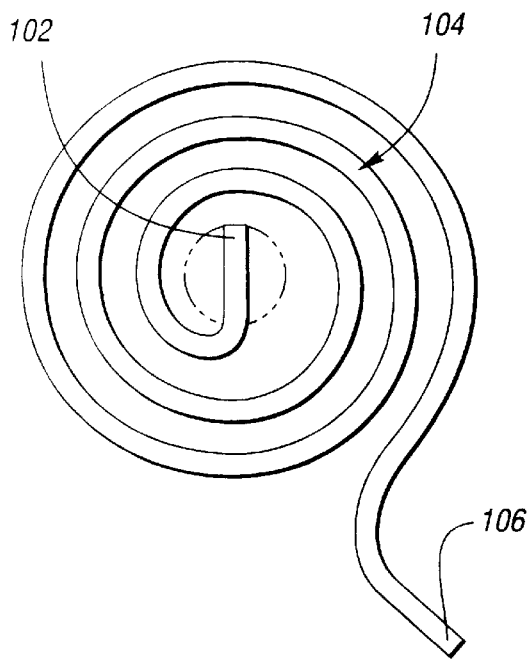
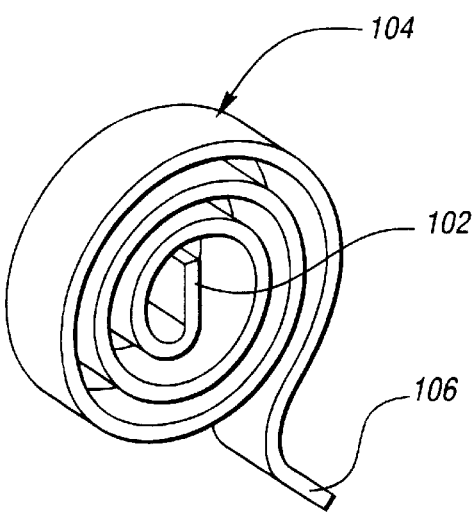

TUMBLE SEAT FOR AN AUTOMOTIVE VEHICLE INCLUDING IMPROVED SEAT CUSHION MOUNTING STRUCTURE

TECHNICAL FIELD

The invention relates to automotive vehicle seat assemblies, particularly tumble seat assemblies that may be pivoted when not in use to an upright position.

BACKGROUND OF THE INVENTION

It is common practice in the design of passenger compartments for multiple-passenger automotive vehicles to provide for three rows of seats, the front row accommodating the vehicle driver and front seat passenger and the rear row accommodating rear passengers. An auxiliary seat may be located between the front row seats and the rear row seats for accommodating additional passengers. When the auxiliary seat is not in use, it is desirable to pivot the auxiliary seat to an upright position, thereby making more convenient passenger ingress and egress to and from the rear seat position through a side door in the passenger compartment.

It also is known design practice to form the auxiliary seat, sometimes referred to as a tumble seat assembly, with three independent sections, two of which can be pivoted independently of the others to an upright position when not in use. For example, in a 40-20-40 seating arrangement, the right-hand section auxiliary seat would occupy 40% of the axial width available for the auxiliary seat assembly. The left-hand section of the auxiliary seat assembly likewise would occupy 40% of the total width. The intermediate section of the auxiliary seat assembly would occupy the remaining 20% of the available width.

The two 40% seat sections of the auxiliary seat assembly may be pivotally mounted on bracket structure which typically would be anchored to the passenger compartment flooring.

BRIEF SUMMARY OF THE INVENTION

The improvement of the present invention includes a bracket assembly with a spring that may be secured at one end to a pivot pin for a section of the auxiliary seat assembly. The bracket assembly may comprise parallel load supporting walls through which the pivot pin extends. In one embodiment of the invention, a seat cushion frame for each section of the auxiliary seat assembly carries an arm member that is pivoted on the pivot pin. The spring acts on the seat cushion frame for the associated section of the auxiliary seat assembly tending to tilt the seat cushion frame to an upright position. When the auxiliary seat section is in use, the auxiliary seat frame can be locked to the passenger compartment flooring by means of a releasable latch mechanism. The latch mechanism does not constitute part of the invention.

When the seat cushion frame pivots about the pivot pin, the auxiliary seat section moves to an upright, generally vertical position. This permits easier ingress and egress through a passenger compartment side door.

In contrast to the present invention, the bracket structure and spring and pivot pin assemblies of prior art constructions typically are of complex construction and include an excessive number of parts which require substantial assembly time. It is furthermore necessary with prior art construction to assemble seat support bracket structures with a preloaded spring for tilting the seat from about the pivotal axis of the support bracket.

It is an object of the invention to provide a bracket structure and pivot assembly for an automotive vehicle tumble seat wherein provision is made for pivoting the tumble seat frame about a pivot pin which in turn is secured to the bracket walls without the need for threaded connections between the pin and the bracket walls for preventing axial and rotary movement of the pivot pin relative to the frame.

It is a further object of the invention to provide seat support bracket structure wherein the bracket structure components may be assembled when they are not under a spring preload, thereby simplifying the assembly procedure.

It is a further object of the present invention to provide a spiral spring, sometimes referred to as a clock spring, for applying a torque on the tumble seat after the assembly procedure, the torque tending normally to urge the tumble seat to an upright position wherein the spring is anchored on the pivot pin, which in turn is secured to the walls of the bracket. The active end of the clock spring acts on the frame of the tumble seat.

Provision is made further for adjusting the pivot pin about its axis during the assembly of the bracket structure so that a pre-tension can be applied to the clock spring. The reaction force of the clock spring is transmitted through the pivot pin and through the connection between the pivot pin and the walls of the bracket.

It will be apparent that modifications to the embodiment of the invention that is described here may be made without department from the scope of the invention.

BRIEF DESCRIPTION OF THE FIGURES IF THE DRAWINGS

FIG. 4 is a side view of a pivot pin used in the bracket structure shown in FIG. 1;

FIG. 4a is an end view of the pivot pin of FIG. 4;

FIG. 5 is a detailed subassembly view showing the pivot pin of FIG. 4 assembled between two walls of a mounting bracket for the assembly of FIG. 3;

FIG. 6 is a side view of a clock spring used in the bracket assembly of the invention;

FIG. 6a is an isometric view of the clock spring of FIG. 6;

DESCRIPTION OF A PREFERRED EMBODIMENT

Figure 1:
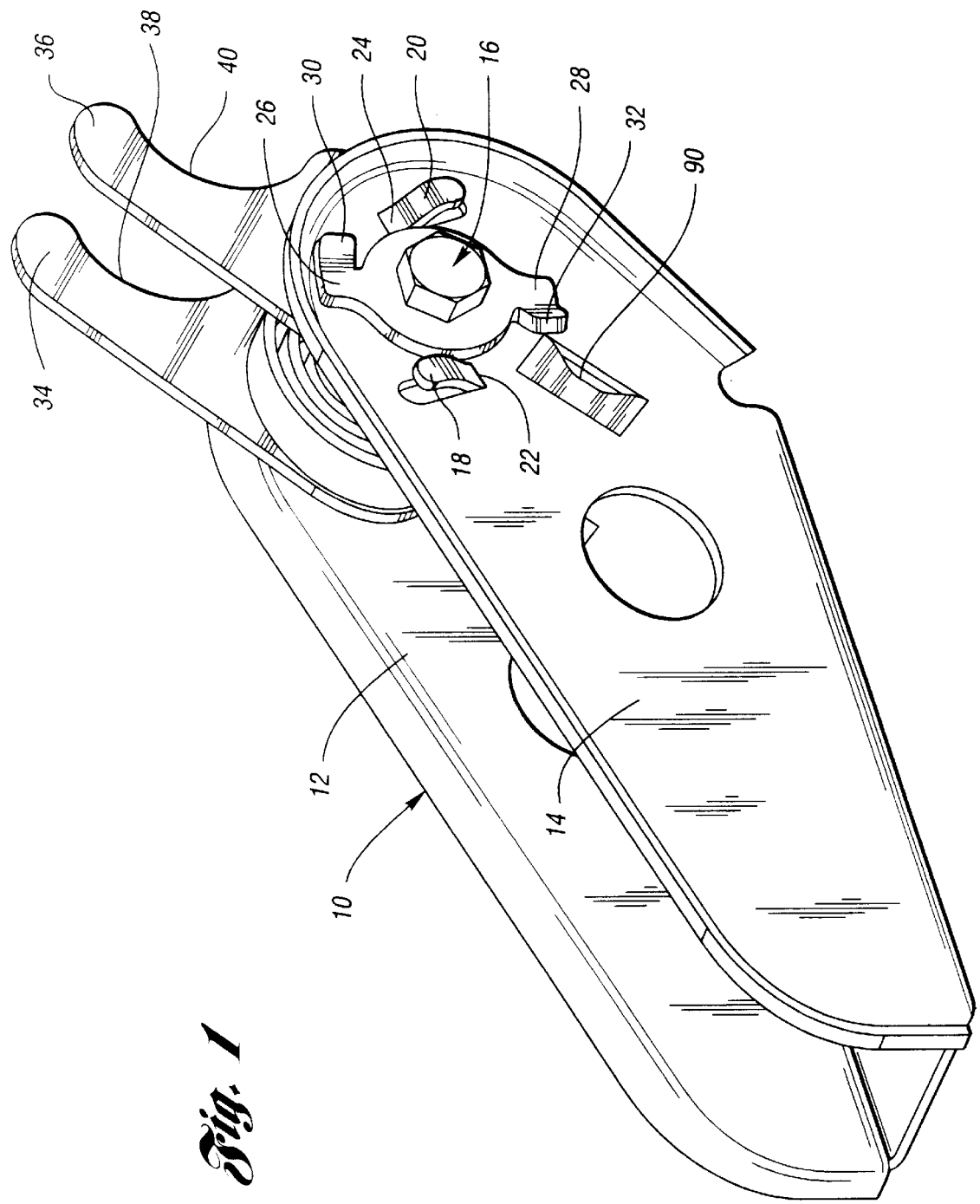
FIG. 1 is an isometric, schematic assembly view of the improved bracket structure of the invention.

In FIG. 1, reference numeral 10 designates generally a mounting bracket for a seat cushion frame for a tumble seat assembly. As will be described more particularly with reference to FIGS. 2 and 7, the bracket 10 is secured to the floor pan of a passenger compartment for an automotive vehicle.

The bracket comprises parallel side walls 12 and 14, which are joined together at their base as will be described with reference to FIG. 2 and 7. A pivot pin 16 extends through openings formed in the side walls 12 and 14, the head of the pin being shown at 110. The side wall 14 is provided with holding tabs 18 and 20 which are punched out of the steel stock of which the side wall 14 is made. The tabs 18 and 20 are secured at their respective bases 22 and 24 to the side wall 14. The opposite ends of the tabs are raised above the plane of side wall 14, as indicated in FIG. 1.

The pin 16 is formed with a pair of arms 26 and 28 extending radially from the axis of the pin. The arms 26 and 28 are located 180° apart. When the pin 16 is rotated in a counterclockwise direction as viewed in FIG. 1, arm 26 will move under the raised end of the tab 18. Likewise, arm 28 will move under the raised end of tab 20 so that rotation of the pin in a clockwise direction will be limited. The pin thus will be locked in place and held against rotation as well as axial movement relative to the bracket 10.

By preference, the arms 26 and 28 are formed with ramp portions 30 and 32, respectively. When the pin 16 is rotated in a clockwise direction, the ramp portions 30 and 32 ride over the tabs 20 and 22, respectively, so that the arms 26 and 28 can be locked under either holding tab, depending upon the angular disposition of the pin with respect to the bracket 10.

Mounting bracket arms 34 and 36 are pivotally mounted on the pivot pin 16. They extend within the side walls 12 and 14 of the bracket 10. The outer extremities of the arms 34 and 36 are secured to a seat cushion frame, as will be described with reference to FIG. 3. By preference, the arms 34 and 36 are welded to the seat cushion frame at surfaces 38 and 40, respectively.

Figure 2:
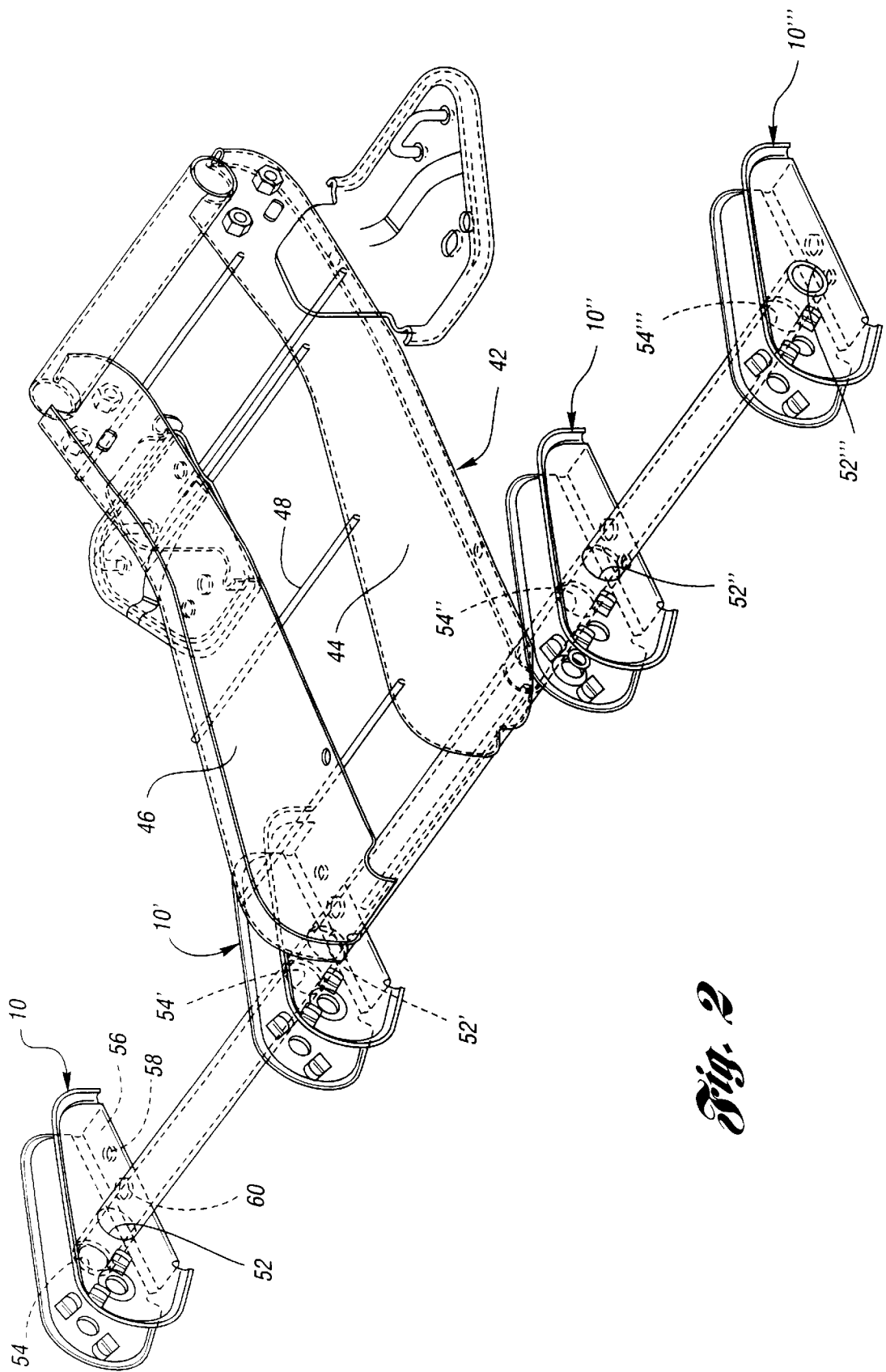
FIG. 2 is an isometric view of one section of a multiple section tumble seat assembly, together with supporting brackets for pivotally mounting the tumble seat section about its forward edge and for accommodating movement to an upright position from the passenger-supporting position shown in FIG. 2.

Shown in FIG. 2 is a portion of a center seat cushion frame. It includes rigid side members 44 and 46. Crossbars 48 extend between the side members 44 and 46 and are joined to the side members to provide a support for the seat cushion. The crossbars 48 extend transversely with respect to the center plane of the vehicle fore-and-aft. Stringers also are used in the seat cushion frame, but they are not illustrated in FIG. 2. Stringers of this kind may be seen in FIG. 3.

Bracket 10 is located, as seen in FIG. 2, at one side of the seat cushion frame 42 for the right auxiliary seat. Corresponding brackets 10', 10" and 10'" also are shown in FIG. 2 for supporting the auxiliary seat cushion frame 42 and a third seat cushion frame at the left side of the passenger compartment. The brackets 10, 10', 10" and 10'" are tied together by a cross beam 50, which extends through openings 52 and 54 in bracket 10, openings 52' and 54' in bracket 10', openings 52" and 54" in bracket 10", and openings 52'" and 54'" in bracket 10'". The beam 50 provides structural rigidity to the tumble seat assemblies.

Figure 7:
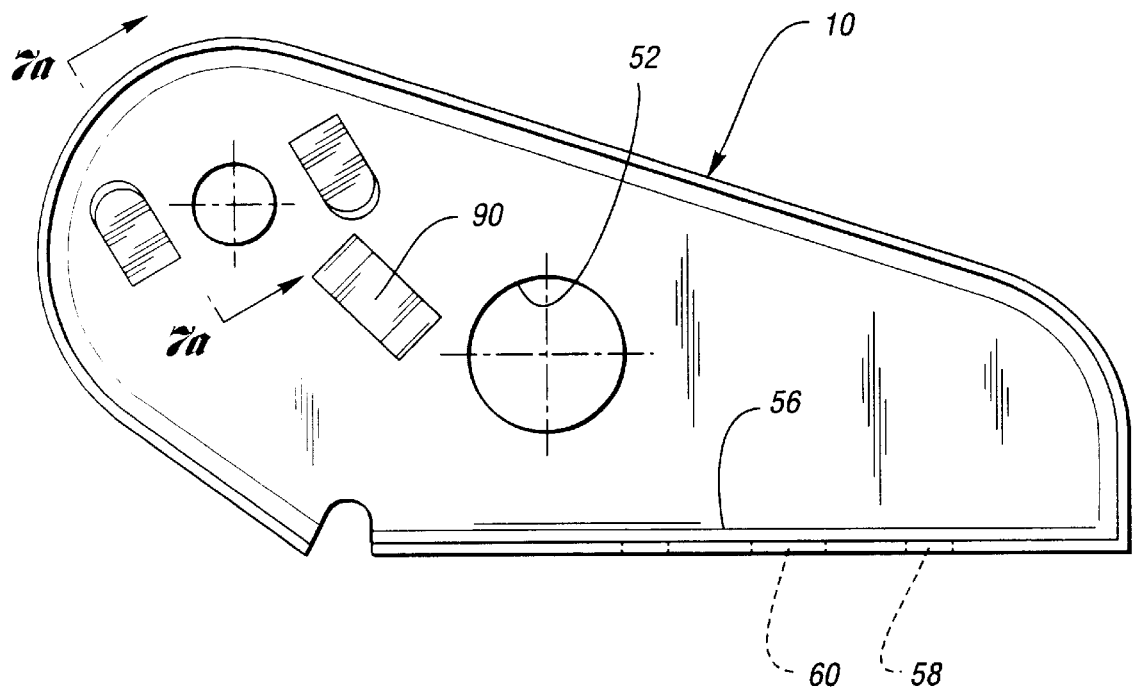
FIG. 7 is a side view showing one wall of the bracket structure illustrated in FIG. 3.
Figure 7A:
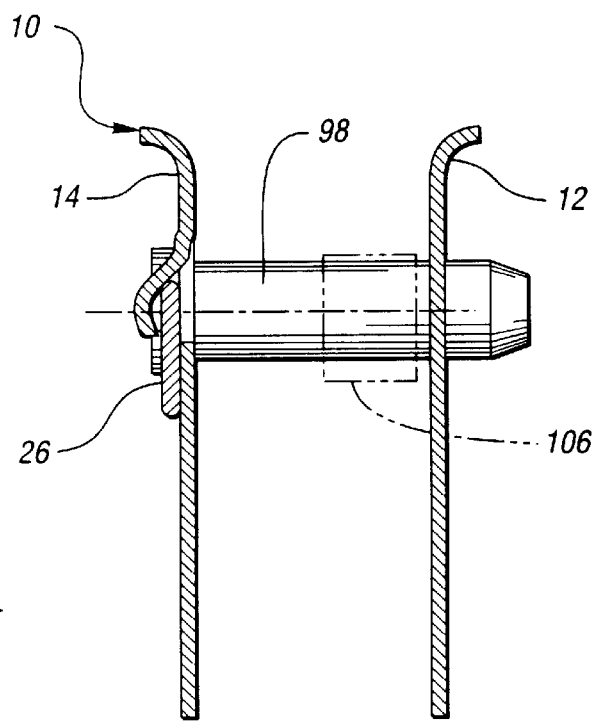
FIG. 7a is a cross-sectional view of the wall of FIG. 7 as seen from the plane of section line 7a–7a FIG. 7.

As seen in FIGS. 2 and 7, the bracket 10 has a base portion 56 that is formed with openings 58 and 60 for accommodating anchor bolts that secure the bracket 10 to the floor pan structure of the vehicle passenger compartment.

Figure 3:
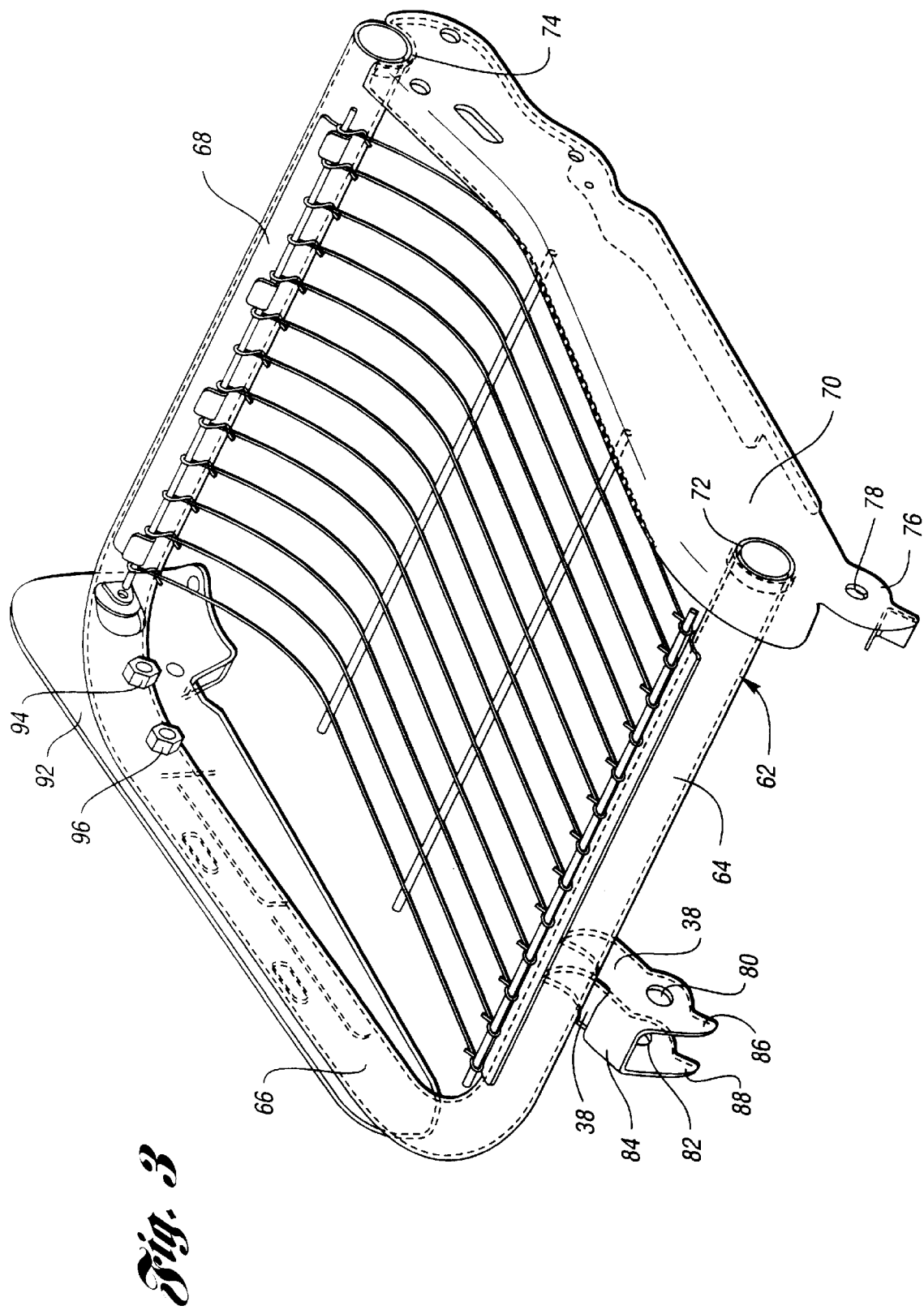
FIG. 3 is an isometric view of a tumble seat cushion frame at one side of a multiple section tumble seat assembly.

Seen in FIG. 3 is a seat cushion frame assembly for the right-hand seat of the three-part tumble seat assembly. The seat cushion frame assembly of FIG. 3 includes a tubular structural frame 62 comprising a forward portion 64, a side portion 66 and a rear portion 68. The ends of the front and rear frame portions 64 and 68 are secured to structural side plate 70, as shown at 72 and 74. The side plate 70 has an extension 76 with an opening 78 for accommodating a pivot pin supported by a bracket (not shown). The arms 36 and 38, as previously described with reference to FIG. 1, are welded or otherwise permanently fixed to the front portion 64 of the tubular frame 62.

Arms 36 and 38 are provided with pivot pin openings 80 and 82, respectively, which receive the pivot pin 16 as will be described with reference to FIG. 4. Arms 36 and 38 are joined by cross member 84 to form a rigid subassembly. Each arm 36 is provided with projections 86 and 88 which engage rigid stops formed in the side plates 14 and 12 of the bracket 10. One of the stops is seen in FIGS. 1 and 7 at 90. These stops are formed by a punching tool in a punching operation which raises the metal of the side members 12 and 14.

When the seat cushion frame of FIG. 3 is pivoted about the pin 16, the extensions 86 and 88 move in a plane of motion that is aligned with the projections 90. Thus, the extent of movement of the seat cushion frame to an upright position is limited as the extensions 86 and 88 engage the projections 90 in the bracket 10.

The seat cushion frame illustrated in FIG. 3 has a side plate 92 which is secured, such as by welding, to the portion 66 of the tubular frame member 62. The side member 92 may be latched to the floor pan structure of the vehicle passenger compartment when the seat frame is in its downward passenger-supporting position. The latching mechanism is not illustrated. Bolts 94 and 96 are part of the latching mechanism.

Shown in FIGS. 4 and 4a is a pivot pin 16' corresponding to the pivot pin 16 shown in FIG. 1. It includes arms 26' and 28' corresponding to the arms 26 and 28 of FIG. 1.

Pivot pin 16' comprises a cylindrical portion 98 which extends between the walls 12 and 14 of the bracket 10 as seen in FIG. 5. A slot 100 is formed in the end of the pin portion 98 as seen in FIG. 4. Slot 100 extends through the pin portion 98 and is formed with a sufficient width and a sufficient depth to permit the innermost end 102 of a clock spring 104 to be inserted through it. The clock spring is shown in FIG. 6 and in FIG. 6a.

The pivot pin arms 26' and 28' do not have ramps corresponding to ramp portions 30 and 32 of the pin 16 shown in FIG. 1, but ramps may be used in the design of pivot pin 16' if that is desired.

The clock spring 104 comprises multiple coils that are wound in a spiral. The active end 106 is curved, as shown in FIGS. 6 and 6a, so that it will engage the tubular frame 62.

The pin 16' is provided with a socket wrench opening 108 in the end of the pin portion 98. In contrast, the pin 16 of FIG. 1 has a hexagonal head 110. The wrench socket opening 108 and the hexagonal head 110 will permit the use of a hand tool to turn the pin in a clockwise direction when the pin is assembled as shown in FIG. 1. This will create a tension in the spring as the spring winds in a fashion similar to the winding of a clock spring in a clock mechanism. A torque then is exerted on the seat cushion frame which attempts to move the frame to an upright position when the frame is unlatched. The tension of the spring can be varied by turning the pin clockwise until the arms 26 and 28 engage an adjacent tab 18 and 20.

When the pivot pin is moved to the spring stressing position, it is locked against axial displacement since the arms 26 and 28 are received under the raised tabs 18 and 20. The bolt can be held in place, therefore, without the need for threads and a threaded nut with lock washers. The clock spring, the arms 38 and 38, and the pivot pin can be disassembled merely by torquing the pin until the arms 26 and 28 move away from the tabs 18 and 20. The pin can then be removed merely by pulling it axially. This facilitates both assembly and disassembly of the bracket structure.

The invention makes it possible to reduce the number of parts that are required to secure a tumble seat in a passenger compartment, thereby reducing the piece cost and assembly time.

The pre-tension that is applied to the clock spring following assembly will keep the arms 26 and 28 firmly against the tabs 18 and 20, thereby eliminating the possibility that the pin and clock spring subassembly will become loose during vehicle use due to normal vehicle vibrations or repeated movement of the tumble seat.

Although preferred embodiments of the invention have been disclosed, the disclosure is not exclusive of other designs. It is contemplated that modifications to the disclosed embodiments may be made by persons skilled in this art without departing from the scope of the claims which are intended to include such modifications and all equivalents.

What is claimed is:

1. A substantially horizontal seat cushion frame having a bracket assembly for mounting the seat cushion frame in the passenger compartment of an automotive vehicle comprising:

a structural bracket having a base portion and at least one side plate;

a pivot pin extending through said side plate;

said frame having at least one arm extending from said frame, said pivot pin rotatably supporting said frame for pivotal movement about said pin;

a spring anchored to said pin at one end of said spring, another end of said spring engaging said frame; and means for rotatably adjusting said pin relative to said bracket side plate thereby tensioning said spring to effect a tilting force moment on said seat cushion frame to normally urge said seat cushion frame to an upright substantially vertical position.

2. A substantially horizontal seat cushion frame having a bracket assembly for mounting the seat cushion frame on a floor in the passenger compartment of an automotive vehicle comprising:

a bracket with a base and a pair of side plates, said base including means for securing said bracket assembly to said floor of said passenger compartment;

a pivot pin with an axis extending through said side plates, a slot formed in said pivot pin extending in the direction of said pin axis;

a spiral spring having its inner end received in said slot and its outer end engageable with said frame;

said frame having secured thereto at least one pivot arm pivoted on said pivot pin; an means for rotatably adjusting said pivot pin relative to said bracket side plates thereby tensioning said spring to effect a tilting force movement on said seat cushion frame to normally urge said seat cushion frame to an upright substantially vertical position.

3. A substantially horizontal seat cushion frame having a bracket assembly for mounting the seat cushion frame on a floor pan in the passenger compartment of an automotive vehicle comprising:

a bracket with a base and a pair of side plates, said base including means for securing said bracket assembly to said floor of said passenger compartment;

a pivot pin with its axis extending through said side plates, said frame being rotatably supported by said pivot pin;

a spiral spring having its inner end detachably secured to said pivot pin and its outer end extending radially from said pin axis and engaging said frame;

said pin having a head with at least one arm extending radially therefrom;

a lock tab in one of said side plates engageable by said pin at least one arm; and means for adjusting said pin rotatably thereby stressing said spring to create a torque load on said frame tending normally to urge said frame to an upright substantially vertical position.

4. The seat cushion frame as set forth in claim 2 wherein said frame has an arm on a forward portion of said frame;

said frame arm extending between said plates, said frame arm being pivoted on said pin.

5. The seat cushion frame as set forth in claim 1 wherein said pin has a head with at least one radially extending arm;

at least one tab on said side plate engageable by said pin arm;

said tab having a portion that overlies said pin arm thereby locking said pin to prevent both rotary and axial movement relative to said side plate.

6. The seat cushion frame as set forth in claim 2 wherein said pin has a head with at least one radially extending arm;

at least one tab on one of said side plates engageable by said pin arm, said tab having a portion that overlies said pin arm thereby locking said pin to prevent both rotary and axial movement relative to said side plates.

* * * * *